US005489318A

United States Patent [19]
Erickson et al.

[11] Patent Number: 5,489,318
[45] Date of Patent: Feb. 6, 1996

[54] ABRASIVE GRAIN COMPRISING CALCIUM OXIDE AND/OR STRONTIUM OXIDE

[75] Inventors: Dwight D. Erickson, Oakdale; William P. Wood, Golden Valley, both of Minn.

[73] Assignee: Minnesota Mining and Manufacturing Company, St. Paul, Minn.

[21] Appl. No.: 240,608

[22] Filed: May 10, 1994

Related U.S. Application Data

[63] Continuation of Ser. No. 989,760, Dec. 14, 1992, abandoned.

[51] Int. Cl.$^6$ ............................................. C09C 1/68
[52] U.S. Cl. .................. 51/309; 51/295; 501/125; 501/127
[58] Field of Search .................. 51/293, 295, 298, 51/309; 501/123, 127, 125

[56] References Cited

U.S. PATENT DOCUMENTS

| | | | |
|---|---|---|---|
| 3,615,308 | 10/1971 | Amero | 51/309 |
| 4,007,020 | 2/1977 | Church et al. | 51/309 |
| 4,314,827 | 2/1982 | Leitheiser et al. | 51/298 |
| 4,518,397 | 5/1985 | Leitheiser et al. | 51/293 |
| 4,543,107 | 9/1985 | Rue | 51/309 |
| 4,574,003 | 3/1986 | Gerk | 51/309 |
| 4,623,364 | 11/1986 | Cottringer et al. | 51/309 |
| 4,626,464 | 12/1986 | Jachowski et al. | 51/309 |
| 4,702,970 | 10/1987 | Sarin et al. | 51/309 |
| 4,744,802 | 5/1988 | Schwabel | 51/309 |
| 4,770,671 | 9/1988 | Monroe et al. | 51/293 |
| 4,799,938 | 1/1989 | Janz et al. | 51/293 |
| 4,867,758 | 9/1989 | Newkirk | 51/293 |
| 4,881,951 | 11/1989 | Wood et al. | 51/293 |
| 4,997,461 | 3/1991 | Markhoff-Matheny et al. | 51/295 |
| 5,053,369 | 10/1991 | Winkler et al. | 501/152 |
| 5,131,926 | 7/1992 | Rostoker et al. | 51/309 |
| 5,139,978 | 8/1992 | Wood | 501/127 |
| 5,164,348 | 11/1992 | Wood | 51/295 |
| 5,190,567 | 3/1993 | Tamamaki et al. | 51/293 |
| 5,194,072 | 3/1993 | Rue et al. | 51/309 |
| 5,204,300 | 4/1993 | Kumagai et al. | 501/127 |
| 5,215,551 | 6/1993 | Hatanaka et al. | 51/293 |

FOREIGN PATENT DOCUMENTS

| | | | |
|---|---|---|---|
| 9100520 | 12/1991 | Austria | C04B 35/10 |
| 408771 | 1/1991 | European Pat. Off. | C04B 35/10 |
| 441640A2 | 8/1991 | European Pat. Off. | C04B 35/10 |
| 504132 | 9/1992 | European Pat. Off. | C04B 35/10 |
| 2099012 | 12/1962 | United Kingdom | B24D 3/34 |
| WO92/01646 | 2/1992 | WIPO | C04B 35/10 |

OTHER PUBLICATIONS

Abstract of "Kinetics and mechanism of transformations of low–temperature forms of alumina in α–aluminum oxide in the presence of additives," STN International, 1985, American Chemical Society.

"Neodymium Sites in Calcium Lanthanide Hexaaluminates, Potential Laser Materials," Gbehi et al., *J. Sol. State Chem.*, 77 (1988), pp. 211–222.

"In Situ Whisker Growth in Sol Gel Abrasive Grain," Talk given at 43rd Pacific Coast Regional Meeting, Pacific Northwest Section of the American Ceramic Society, Inc., Oct. 25–27, 1990 (copy of talk outline enclosed).

"Dense Polycrystalline Calcium β"– and β–Aluminas: Synthesis, Xrd Characterization and Thermal Stability," Kirchnerova et al., *Mat. Sci. Bull.*, 26 (1991), pp. 527–534.

*Primary Examiner*—Deborah Jones
*Attorney, Agent, or Firm*—Gary L. Griswold; Walter N. Kirn; Gregory D. Allen

[57] ABSTRACT

Alumina-based abrasive grain comprising rare earth oxide and calcium oxide and/or strontium oxide, and a method of making the same. The abrasive grain is useful in abrasive articles, such as coated abrasives, three-dimensional, low density abrasives, and bonded abrasives.

18 Claims, 2 Drawing Sheets

ABRASIVE GRAIN COMPRISING CALCIUM OXIDE AND/OR STRONTIUM OXIDE

This is a continuation of application Ser. No. 07/989,760 filed Dec. 14, 1992, now abandoned.

FIELD OF THE INVENTION

The present invention relates to alumina-based ceramic comprising calcium oxide and/or strontium oxide, and a method of making the same.

DESCRIPTION OF THE RELATED ART

The abrasives industry generally concerns abrasive products comprising binder and a plurality of abrasive grain used to abrade a workpiece (e.g., stainless steel). Desirable abrasive grains are hard, tough and chemically resistant to the workpiece being abraded. The hardness property is associated with the abrasive grain not yielding from forces of grinding and not dulling. The toughness property is associated with strength and fracture resistance of the abrasive grain.

In general, it is known that inclusion of various materials within an alpha alumina-based abrasive grain will modify the characteristics of the grain. While additives are generally added to improve the properties of the abrasive grain, some additives are unintentionally present (e.g., contaminants). For example, the inclusion of calcium (typically as a contaminate) at levels on the order of 0.07 percent by weight or more (usually 0.1% or more) of calcium oxide (calculated on a theoretical oxide basis as CaO) is associated with the undesirable formation of relatively soft beta alumina, the effects of which is to provide a ceramic abrasive grain of relatively low hardness.

SUMMARY OF THE INVENTION

The present invention provides a ceramic abrasive grain comprising (a) an alpha alumina matrix; and (b) at least 0.07 percent by weight of one of calcium oxide, strontium oxide, or a combination thereof (calculated on a theoretical oxide basis as CaO and SrO), based on the total weight of the ceramic abrasive grain, in the form of a crystalline reaction product(s) (i.e., one or more reaction products) with aluminum oxide, and rare earth oxide selected from the group consisting of praseodymium oxide, samarium oxide, europium oxide, holmium oxide, lanthanum oxide, gadolinium oxide, dysprosium oxide, cerium oxide, neodymium oxide, erbium oxide, and mixtures thereof (calculated on a theoretical oxide basis as $Pr_2O_3$, $Sm_2O_3$, $Eu_2O_3$, $HO_2O_3$, $La_2O_3$, $Gd_2O_3$, $Dy_2O_3$, $Ce_2O_3$, $Nd_2O_3$, and $Er_2O_3$, respectively), the crystalline reaction product(s) comprising a phase within the alpha alumina matrix, the ceramic abrasive grain having an average hardness of at least 17 GPa. Preferably, substantially all of the calcium oxide and strontium oxide present is in the form of a crystalline reaction product(s) with aluminum oxide and rare earth oxide. More preferably, essentially all of the calcium oxide and strontium oxide present is in the form of a crystalline reaction product(s) with aluminum oxide and rare earth oxide.

Abrasive grain according to the present invention comprising calcium oxide does not, in general, possess the undesirable characteristics associated with beta alumina formation. During formation of the abrasive grain according to the present invention, calcium (if present) in the grain precursor reacts with aluminum oxide and rare earth oxide to form reaction product(s) comprising a crystalline structure. Generally, these reaction products are separate phase(s) within the alpha alumina matrix.

When it is said that the abrasive grain includes, for example, calcium oxide, rare earth oxide, etc., it is meant that the abrasive grain includes the presence of those components, not that such an oxide is necessarily present itself. Some of the calcium oxide may be present, for example, as CaO, while some may be present, for example, in a reaction product(s) (including some as beta alumina). Alternatively, all the calcium oxide may be present as reaction product(s).

In another aspect, the present invention provides a method for making a preferred abrasive grain, the method comprising the steps of:

(a) providing an alpha alumina-based ceramic abrasive grain precursor comprising:
  (i) a sufficient amount of Ca/Sr material (i.e., one of calcium oxide, strontium oxide, precursors thereof, or mixtures thereof) to provide when the alpha alumina-based ceramic abrasive grain precursor is converted to alpha alumina-based ceramic abrasive grain, the alpha alumina-based ceramic abrasive grain includes ceramic at least 0.07 percent by weight of one of calcium oxide, strontium oxide, or mixtures thereof, based on the total weight of alpha alumina-based ceramic abrasive grain (calculated on a theoretical oxide basis as CaO and SrO);
  (ii) rare earth material selected from the group consisting of praseodymium oxide, samarium oxide, europium oxide, holmium oxide, lanthanum oxide, gadolinium oxide, dysprosium oxide, cerium oxide, neodymium oxide, erbium oxide, precursors thereof, and mixtures thereof (calculated on a theoretical oxide basis as $Pr_2O_3$, $Sm_2O_3$, $Eu_2O_3$, $HO_2O_3$, $La_2O_3$, $Gd_2O_3$, $Dy_2O_3$, $Ce_2O_3$, $Nd_2O_3$, and $Er_2O_3$, respectively); the rare earth material being provided in an amount sufficient to react during sintering with substantially all of the Ca/Sr material present in the alpha alumina-based ceramic abrasive precursor to form a crystalline reaction product(s) comprising a phase(s) within a resulting alpha alumina matrix, the phase(s) comprising aluminum oxide, rare earth oxide, and one of calcium oxide, strontium oxide, or a combination thereof; and (b) heating (e.g., sintering and, if necessary, calcining before sintering) the alpha alumina-based ceramic abrasive grain precursor to provide an alpha alumina-based ceramic abrasive grain comprising at least 0.07 percent by weight of one of calcium oxide, strontium oxide, or a combination thereof, based on the total weight of the abrasive grain, therein in a crystalline reaction product(s) with aluminum oxide and rare earth oxide, the alpha alumina-based (sintered,) ceramic abrasive grain having an average hardness of at least 17 GPa.

One advantage of the method of the present invention is that it, as described, allows for the presence of calcium and/or strontium in the abrasive grain precursor because, during sintering, these materials are taken up into a crystalline form which does not interfere with development of the desired hard, dense, alpha alumina ceramic product.

An advantage offered by the presence of the rare earth material is that a "rare earth oxide-aluminum oxide-calcium oxide and/or strontium oxide" phase(s) is formed during sintering rather than, for example, calcium and/or strontium beta alumina. Calcium oxide and/or strontium oxide can be introduced into the ceramic precursor at any convenient time during preparation thereof, including as a contaminant within other components or within processing water, and/or as CaO, SrO, and/or a precursor thereof, although strontium is less likely to be present as a contaminant.

The use of language such as "reacting or taking up substantially all of the Ca/Sr material" in the reaction product with aluminum oxide and rare earth material means that a sufficient amount of Ca/Sr material reacts with aluminum oxide and rare earth material during sintering to avoid significant deleterious effects on hardness or similar physical properties of the resulting ceramic, which would otherwise be associated with the presence of the Ca/Sr material therein without such a reaction(s) taking place. In general, the negative effects of calcium presence, for example, are not observed until the level of calcium material within the ceramic precursor is in an amount sufficient to provide the (sintered,) ceramic abrasive grain with about 0.07 percent calcium oxide by weight or more, based on the total weight of the ceramic abrasive grain (calculated on a theoretical oxide basis as CaO). For example, if about 0.07 percent or more of calcium oxide remains unreacted with aluminum oxide and rare earth oxide, no significant negative effects on the resulting ceramic are observed, and "substantially all" of the Ca/Sr material will be considered to have been reacted. A similar analysis applies for any strontium oxide present.

Abrasive grain according to the present invention may further comprise "other modifying oxide additives" which provide desired physical and/or chemical properties to the resulting ceramic abrasive grain. Such modifying additives, which are preferably present in the amount of 0.1 percent by weight or more, based on the total weight of the ceramic abrasive grain, can be selected from the group consisting of magnesium oxide, yttrium oxide, zinc oxide, zirconium oxide, titanium oxide, hafnium oxide, nickel oxide, silicon oxide, cobalt oxide, chromium oxide, iron oxide, and mixtures thereof (calculated on a theoretical oxide basis as $MgO$, $Y_2O_3$, $ZnO$, $ZrO_2$, $NiO$, $TiO_2$, $HfO_2$, $SiO_2$, $CoO$, $Cr_2O_3$, and $Fe_2O_3$, respectively). More preferably, such modifiers are present in the range from about 0.1 to about 5 percent by weight.

Abrasive grain according to the present invention are useful in abrasive products (e.g., coated abrasives, three-dimensional, low density ("nonwoven") abrasives, cutoff wheels, and grinding wheels).

DETAILED DESCRIPTION OF THE INVENTION

Abrasive grain according to the present invention is typically hard (e.g., has a hardness of about 17 GPa or more) and tough (e.g., has toughness of at least 3 $MPa.m^{1/2}$ or more).

Herein the terms "abrasive grain," "ceramic grain," or variants thereof, are used to refer to the granular abrasive material after it has been prepared (sintered) for inclusion in an abrasive product. The terms "base grit, " "base grit material, " and "abrasive grain precursor," or variants thereof, are used to refer to ceramic grain precursor which, when sintered or calcined and sintered, provide (ceramic) abrasive grain.

PREPARATION OF ABRASIVE GRAIN ACCORDING TO THE PRESENT INVENTION

The Base Grits

The base grits are generally made by preparing a dispersion of alumina hydrate, which is dried to provide base grit material. The dried dispersion can be crushed to produce particles. Alternatively, the dispersion can be only partially dried, shaped, and then further dried to base grit material. The base grit material is converted to abrasive grain by sintering. Optionally, the base grits can be classified and/or modified prior to the sintering process. The base grit material can be initially formed (e.g., from a dispersion) with calcium oxide, strontium oxide, and/or other oxide(s) (i.e., rare earth material and/or other modifying additives) included therein; and/or the base grit material can be modified after its initial formation to incorporate such materials.

Preferred base grit material for utilization as particles in processes according to the present invention is prepared according to modifications of known sol-gel processes. Such processes, for example, are disclosed in U.S. Pat. Nos. 5,011,508 (Wald), 4,744,802 (Schwabel), 4,574,003 (Gerk), 4,518,397 (Leitheiser et al.), and 4,314,827 (Leitheiser et al.), the disclosures of which are incorporated herein by reference, and U.S. Pat. No. 4,623,364 (Cottringer). Modifications to the processes in order to achieve the improved product of the present invention are indicated herein.

Preparation of the base grits by a sol-gel process typically involves first preparing a dispersion comprising from about 2 to about 60% by weight alpha aluminum oxide monohydrate (typically boehmite), although other hydrates may be used. The weight percent is based on a total of hydrate plus liquid carrier, without regard to adjuvants or additives. The boehmite can be prepared from various conventional techniques or it can be acquired commercially. Suitable boehmite is commercially available under the trade designations "DISPERAL" from Condea Chemie, GmbH of Hamburg, Germany, and "CATAPAL" from Vista Chemical Co., Houston, Tex. These aluminum oxide monohydrates are in alpha form, are relatively pure (including relatively little, if any, hydrate phases other than monohydrate), and have high surface area.

Although the liquid carrier may be a non-polar organic carrier (e.g., heptane or hexane), the liquid carrier is typically water (including deionized water). Generally the dispersion (with respect to all components) contains at least 10% by weight liquid carrier, preferably, between about 30 and about 80% by weight liquid carrier.

A peptizing agent may be used in the boehmite dispersion to produce a more stable hydrosol or colloidal dispersion. Monoprotic acids which may be used as the peptizing agent include acetic, hydrochloric, formic, and nitric acids. Nitric acid is the preferred peptizing agent. Multiprotic acids are generally avoided because they tend to rapidly gel the dispersion, making it difficult to handle or to mix in additional components. Some commercial sources of boehmite contain an acid titer (e.g., acetic, formic, or nitric acid) to assist in forming a stable dispersion.

Exact proportions of these components present in the sol-gel dispersions (for grit formation) are not critical to the principles of the present invention and thus can be varied to convenience.

The dispersion may contain a nucleating material in an amount effective to enhance the transformation to alpha alumina. The term "nucleating material" as used herein refers to a nucleating agent or precursor thereof. Suitable nucleating materials include fine particles of alpha alumina, alpha ferric oxide or its precursor, titanates or their precursors, chromium oxide or its precursor, and other materials which can nucleate the transformation of the base grits during sintering. Nucleating such dispersions is disclosed, for example, in U.S. Pat. Nos. 4,774,802 (Schwabel) and 4,964,883 (Morris), the disclosures of which are incorporated herein by reference for their teaching of nucleation, and U.S. Pat. No. 4,623,364 (Cottringer) and copending application having Ser. No. 07/552,489, filed Jul. 16, 1990.

It has been determined that in many instances it is desirable to include zirconium oxide and/or cerium oxide in abrasive grain precursor to achieve a ceramic abrasive grain with improved properties. It has been found that when cerium oxide and/or zirconium oxide are to be included, they are preferably introduced as sols in the dispersion of alpha aluminum oxide monohydrate. For additional details, see copending applications having Ser. Nos. 07/951,443 and 07/951,654, filed Sep. 25, 1992, the disclosures of which are incorporated herein by reference for their teachings of employing zirconia and ceria sols.

The pH of the dispersion effects how fast the dispersion thickens or gels. Typically, the pH should be in the range of about 1.5 to about 4. In general, the lower the pH, the higher the rate of gelation. The addition of the modifier precursor generally results in gelation of the dispersion.

Shaping of the gel, which is optional, may be accomplished by conventional means such as pressing, molding, coating, extrusion, cutting, or some combination of those steps, with drying. It may be done in steps, for example, by first forming a plastic mass of the partially dried dispersion through extrusion. The resulting plastic mass is shaped by any convenient method such as pressing, molding, or extrusion, and then dried to produce the desired shape, for example, a rod, pyramid, disk, diamond, cone, or similar shape. Irregularly-shaped abrasive grain products are conveniently formed by depositing the dispersion in any convenient size and shape of drying vessel (e.g., a pan-shaped vessel) and drying, typically at a temperature below the frothing temperature of the dispersion.

Whether shaped or not, the dispersion or gelled dispersion is generally dried (e.g., dewatered) to a solid. Conventional means may be utilized to dry the dispersion. Air drying steps may be used, as well as various dewatering methods. Drying can be accomplished, for example, in a forced air oven at a temperature in the range of about 50° C. to about 200° C., preferably between about 75° C. and about 125° C. Generally, the gelled dispersion is heated slowly during drying to inhibit frothing.

After the dispersion is dry, it may be crushed or shaped through any suitable means. Examples of crushing techniques include use of a hammer mill, ball mill, or roll crusher. Any method of comminuting the solid can be used, and the term "crushing" is meant to refer to any such method. In general, a wide variety of particle sizes, i.e., about 10 to about 4000 micrometers, may be used as base grits. Generally a selected size range is isolated for any given use. Classification steps such as screening may be used to obtain selected particle sizes or size fractions. It is noted that sintering, or calcining and sintering, generally leads to particle shrinkage on the order of about 33% of linear dimension. This should be taken into consideration during fraction selection.

In typical applications, it will be preferred to calcine the base grit material to remove water or other volatiles. If the grits are formed using a non-polar organic solvent as the liquid carrier, a calcining step is typically not needed.

During calcining, essentially all of the volatiles are removed from the grit precursor. Also, any modifier precursors that were present in the dispersion and which are now retained within the grit precursor are transformed to an oxide during the calcining process. During calcining, the base grits are generally heated to a temperature between about 400° C. and about 1000° C., preferably about 400° C. to about 800° C. The base grits are held within the temperature range until the free water and preferably over about 90 wt % of any bound volatiles are removed. Further, if the grit precursor contains a modifier precursor, the base grits are preferably calcined for a period of time sufficient to achieve essentially complete conversion of the modifier precursor to oxide. The resulting calcined base grits are porous particles.

Incorporation of Ca/Sr Material and Rare Earth Material and, Optionally, Other Oxide Material(s) into the Base Grits According to the present invention, the base grits are modified by the inclusion therein of Ca/Sr material and rare earth material, and, optionally, other oxide(s). The step of modification with respect to each component (independently or together) can be conducted either during base grit formation (e.g., by additions to a dispersion) and/or following base grit formation.

In general, it is desirable to incorporate an effective amount of calcium oxide and/or strontium oxide and certain other metal oxide(s) to achieve improvement in the resulting abrasive grain. Improvement is generally measured by comparison of the hardness, toughness, density or performance of abrasive material made with incorporation of the added material (i.e., Ca/Sr material) to abrasive grain without the added material. Alternatively, the improvement may be that calcium and/or strontium contaminant can be tolerated without significant loss (e.g., greater than about 15%) in a physical property or abrasive performance.

In typical applications, improvement will be found if the base grit material is provided with sufficient amounts of the components so that the final (sintered) ceramic abrasive grain comprises about 70 to about 99.8% by weight, preferably, about 80 to about 99%, most preferably, about 90 to about 96% aluminum oxide; about 0.01 to about 2%, preferably about 0.1 to about 2%, and, most preferably, about 0.5 to about 1.5% calcium oxide and/or strontium oxide; and about 0.01 to about 15%, preferably about 0.5 to about 10%, and, most preferably, about 2 to 5% rare earth oxide, based on the total weight of the ceramic abrasive grain. The weight percent is stated without regard to the phases present and without regard to the presence of any coating on the abrasive grain. Thus, should the abrasive grain be coated, the weight percent is based upon or calculated based upon the grain (i.e., the sintered core) minus the weight of the coating.

The stoichiometric ratio between calcium oxide, strontium oxide, or both, and rare earth oxide (calculated on a theoretical oxide basis as described above) with aluminum oxide will have an effect on the properties (and microstructure) of the resulting product. In particular, excess calcium oxide and/or strontium oxide is to be avoided because (calcium and strontium) beta alumina tends to form.

Rare earth material, Ca/Sr material, if specifically added, and other modifying additives (e.g., magnesium oxide, yttrium oxide, zinc oxide, zirconium oxide, titanium oxide, hafnium oxide, nickel oxide, silicon oxide, cobalt oxide, chromium oxide, iron oxide, and combinations thereof) may be introduced by adding the oxide and/or a precursor thereof (e.g., a salt such as a nitrate salt) into the dispersion of aluminum monohydrate during the base grit formation, and/or introducing the precursor thereof into the base grits after their formation (typically after calcining of the base grits) through impregnation. Preferably, the rare earth material, Ca/Sr material, if specifically added, and other modifying additives (if added) are introduced by impregnation of a salt solution into base grit material. A reason for this is that if precursor salt is introduced during the sol-gel process (i.e., in the dispersion of alpha alumina monohydrate), migration of the salt(s) during drying may lead to non-uniform grit to grit dispersion of the oxide(s) in sintered ceramic abrasive grain.

Introduction of oxide precursors into the sol-gel involves mixing an appropriate oxide precursor (e.g., metal salt) into the dispersion. The calcium oxide precursor may be, for example, a calcium alkylate, typically calcium formate or calcium acetate, or a salt such as calcium nitrate. Such salts are water soluble, and, thus, can be readily mixed into the dispersion in the sol-gel process, provided the liquid carrier is water (including deionized water). The most readily available chemical forms of rare earth material are typically the oxides, which are converted to the salts (modifier precursors) by reaction with an excess of concentrated nitric acid to produce a nitrate solution. The nitrate solution can be readily introduced into the dispersion of the sol-gel process through mixing. For additional details of adding modifiers and their uses in abrasive grains, see, for example, U.S. Pat. Nos 4,518,397 (Leitheiser et al.), 4,770,671 (Monroe), and 4,881,951 (Wood), the disclosures each of which are incorporated herein by reference. Further, for details of the incorporation of nucleating materials, see, for example, U.S. Pat. Nos. 4,774,802 (Schwabel), 4,964,883 (Morris), 5,164,348 (Wood), and copending application having Ser. No. 07/552,489, filed Jul. 16, 1990.

Base grits prepared according to the sol-gel process are porous, i.e., they generally have pores about 7–9 nanometers in size (diameter) extending therein from an outer surface. When mixed with a liquid carrier (including deionized water) containing dissolved metal salt therein, the metal salt can impregnate the pores through capillary action. When dried and calcined, the impregnate (metal oxide precursors) will be converted to the metal oxides.

In general, all that is required for introduction of metal oxide precursor through the impregnation process is a mixing of an appropriate amount of carrier liquid with the base grits. Generally, enough liquid carrier should be used to give substantial saturation (at least 70% saturation) of the grits. When the base grits are prepared according to the sol-gel process described above, wherein the base grits are derived from an aqueous dispersion of "DISPERAL" boehmite, about 50 ml or more of liquid carrier with impregnate dissolved therein should be mixed with each 100 grams of base grits. If the ratio is within the 50 to 60 ml per 100 gram range, in general all of the dissolved oxide precursor will impregnate the base grits (i.e., excess solution is preferably avoided). From the above descriptions, it will be understood that when impregnation is used, the modifier (or modifier precursor) will be preferentially partitioned toward outer parts of the abrasive grain. Introduction of various materials into base grits by an impregnation process is generally described in U.S. Pat. No. 5,164,348 (Wood), the disclosure of which is incorporated herein by reference for its teaching of impregnating various materials into calcined material.

For impregnation of dried gel, the liquid medium should be selected such that the dried gel is not dissolved by it. For example, a dried gel derived from an aqueous gel will dissolve in water. A suitable liquid medium for an impregnating solution for a dried gel derived from an aqueous gel may be a non-polar solvent. Alternatively, when a dried gel is calcined, the liquid medium for impregnation can be water.

Abrasive grains according to the present invention may further comprise a surface coating (i.e., a coating covering the sintered core). Typically, the coating will comprise metal (or semimetallic) oxide, most typically zirconia, silica or alumina (e.g., alpha alumina, transitional alumina, or hydrated alumina). Any of a variety of coating methods may be utilized, including the ones described in U.S. Pat. Nos. 5,011,508 (Wald), 1,910,440 (Nicholson), 3,041,156 (Rowse), 5,009,675 (Kunz), 4,997,461 (Markhoff-Matheny), and 5,042,991 (Kunz). The preparation of the coating may include the use of nucleating material. In some instances, a preferred coating, not described in the above-cited references, may be applied to the base grits by addition of a dispersion or suspension carrying inorganic particulates (typically metal oxides) therein to the base grits. A coating formed from inorganic particulates in this manner is described in Assignee's copending U.S. application Ser. No. 07/920,768, incorporated herein by reference. An alternative coating formed from metal alkoxides is described in Assignee's copending U.S. application Ser. No. 07/920,834, incorporated herein by reference.

The principal step of converting the base grit (uncalcined dried gel or calcined dried gel) to abrasive grain is sintering to form the ceramic abrasive grain comprising alpha alumina and at least one of calcium oxide or strontium oxide reaction product with aluminum oxide and rare earth oxide.

Sintering of the grain may be accomplished through a variety of conventional processes. Typically the sintering will be conducted at a temperature between about 1200° C. and 1650° C. for a time sufficient to complete the conversion of the precursor to the abrasive grain. Generally, the sintering step comprises the conversion of alpha alumina precursor (e.g., transitional alumina) to alpha alumina and calcium oxide and/or strontium oxide form reaction product with aluminum oxide and rare earth oxide (and oxide modifier(s), if present). Although the length of time to which the treated base grit should be exposed to sintering temperatures may be varied depending upon factors such as the precise composition of the grit, generally sintering can be accomplished within a time period of a few seconds to about 120 minutes. Sintering of various types of base grit is described in general in U.S. Pat. No. 4,314,827 (Leitheiser et al.), incorporated herein by reference. The techniques of sintering described in that reference may be applied to grit prepared according to the present invention.

The Resulting Abrasive Grain

Figure 4:
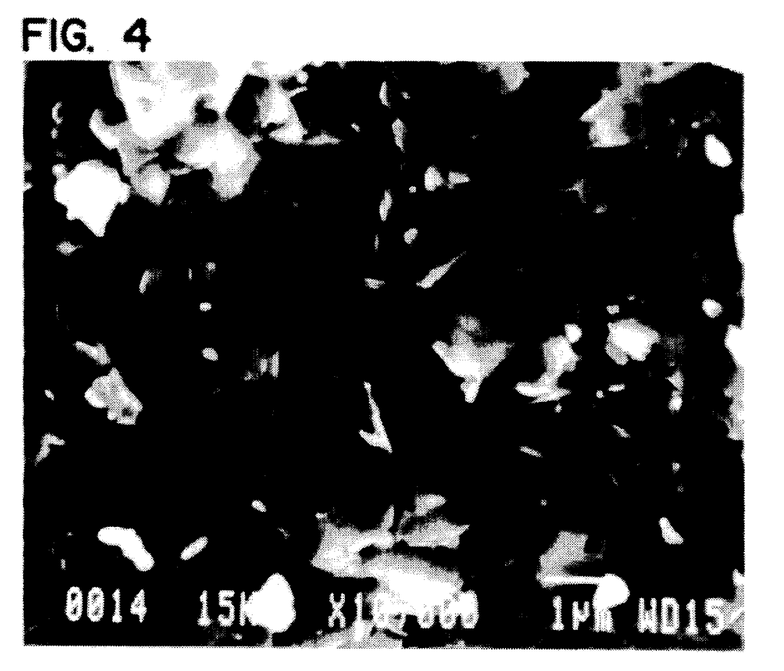
FIG. 4 is a scanning electron photomicrograph of abrasive grain according to the present invention (Example 4) taken at 10,000×.
Figure 5:
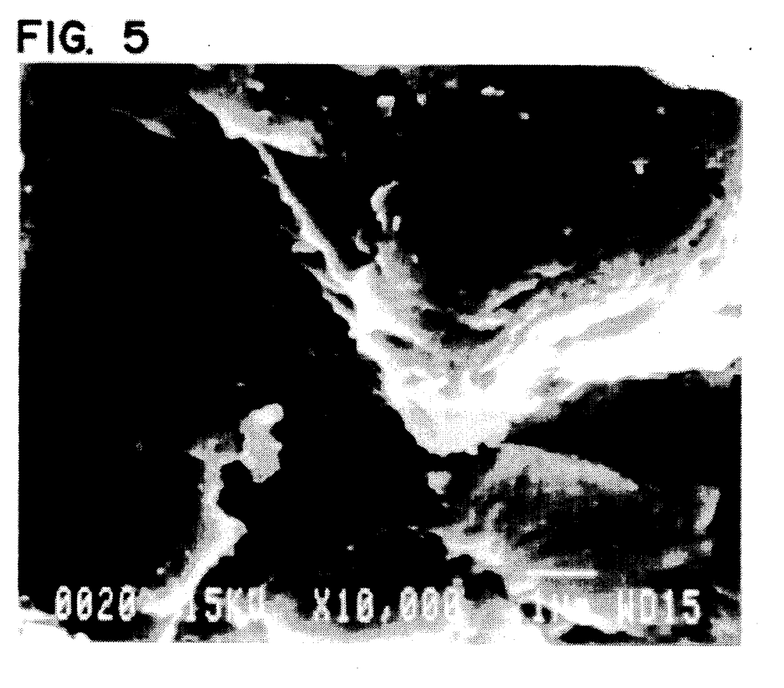
FIG. 5 is a scanning electron photomicrograph of comparative abrasive grain (Comparative Example A) taken at 10,000×.

Certain preferred abrasive grain according to the present invention is depicted in the electron photomicrograph of FIG. 4. The electron photomicrographs of FIGS. 4 and 5 are fractured surfaces with no thermal etch. The abrasive grain of FIG. 4 contained by weight 95.1% aluminum oxide, 3.7% neodymium oxide, and 1.2% calcium oxide (calculated on a theoretical oxide basis as $Al_2O_3$, $Nd_2O_3$, and CaO, respectively, based on the total weight of the abrasive grain), without regard to phases present. The abrasive grain of FIG. 4 was prepared according to Example 4. Referring to FIG. 4, there is evidence of platelets. The formation of these platelets is attributable to the presence of calcium oxide and generally comprises crystalline reaction product including aluminum oxide, neodymium oxide, and calcium oxide. The abrasive grain of FIG. 5 (Comparative A) contained 95.1% aluminum oxide, 4.9% neodymium oxide, and 0% calcium oxide (calculated on a theoretical oxide basis as $Al_2O_3$, $Nd_2O_3$, and CaO, respectively). For the sample of FIG. 5, there is no evidence of any platelets. The small white particles in FIG. 5 comprise $NdAlO_4$.

In general, the platelets result from the reaction of aluminum oxide, Ca/Sr material, rare earth material, and, optionally, a divalent metal cation material capable of forming a spinel to provide a phase(s) having a magnetoplumbite structure. It is believed that the presence of the platelets, which are dispersed with the alpha alumina matrix, inhibit crack propagation through the abrasive grain.

The Effect of Calcium Oxide and/or Strontium Oxide Presence with Selected Oxides in the Abrasive Grain The combination of alpha alumina and a reaction product of calcium oxide and/or strontium oxide, aluminum oxide, and rare earth oxide results in an abrasive grain exhibiting desirable abrading characteristics, especially by comparison to abrasive grain containing alpha alumina and calcium oxide and/or strontium oxide without the reaction product. Evidence of this is provided in the examples described in detail below. Although not wanting to be bound by any particular theory, it is believed that attainment of advantage is related to utilization of the components, in addition to the alpha alumina, to develop preferred microstructures for hard, dense ceramic grain.

More specifically, during sintering of base grit material to form ceramic abrasive grain, transitional alumina(s) is transformed to alpha alumina. During sintering, the Ca/Sr material can react with rare earth material and aluminum oxide to form a reaction product(s). The calcium oxide and/or strontium-aluminum oxide-rare earth oxide reaction product(s) generally comprise crystalline reaction product(s) that form a separate phase within the alpha alumina matrix. Depending on whether calcium, strontium, or both, are present, and what other materials are present, the crystalline reaction product(s) may include $SrLnAlO_4$, $Sr_{1-x}Ln_xAl_{12-x}O_{19-x}$, $Sr_{1-x}Ln_xM_xAl_{12-x}O_{19}$, $CaLnAlO_4$, $Ca_{1-x}Ln_xAl_{12-x}O_{19-x}$ and $Ca_{1-x}Ln_xM_xAl_{12-x}O_{19}$, wherein: Ln is selected from the group consisting of ions of Pr, Sm, Eu, Ho, La, Gd, Dy, Ce, Nd, Er, and mixtures thereof; M is a divalent metal cation(s) (e.g., Mg, Fe, Ni, Zn, Co, or combinations thereof); Sr is strontium ion; Ca is calcium ion; Al is aluminum ion; O is oxygen; and $1 \geq x \geq 0$. Note that the products which include M assume the presence of a source of divalent metal ion(s) in the ceramic grain precursor. The oxides of such metals generally suffice. It is believed that the presence of these reaction products increase the fracture resistance or toughness of the sintered ceramic abrasive grain.

The ratios of various metal oxides (or oxide precursors) in the abrasive grain precursor have a significant effect on which reaction product is formed. For example, abrasive grain comprising the sintered reaction product of a precursor containing aluminum oxide, calcium oxide, and lanthanum oxide may comprise an alpha alumina phase and a $CaLaAlO_4$ phase.

Further, Ca/Sr material is capable of reacting with aluminum oxide to form $CaAl_{12}O_{19}$ or $SrAl_{12}O_{19}$, respectively (i.e., beta alumina phases). Such materials are relatively soft and do not always sinter properly to provide desirable densification. As long as calcium oxide and/or strontium oxide are not present in stoichiometric excess relative to the rare earth oxide for formation of the crystalline reaction product, no significant problem is presented. A reason for this is that it appears that the rare earth reaction product(s) (e.g., $Sr_{1-x}Ln_xAl_{12-x}O_{19-x}$; $Sr_{1-x}Ln_xM_xAl_{12-x}O_{19}$; and $Ca_{1-x}Ln_xAl_{12-x}O_{19}$) preferentially form.

Moreover, the rare earth material may react only with aluminum oxide (rather than both aluminum oxide and Ca/Sr material) to form a secondary phase. In particular, praseodymium oxide, samarium oxide, europium oxide, holmium oxide, lanthanum oxide, gadolinium oxide, dysprosium oxide, cerium oxide, neodymium oxide, erbium oxide, precursors thereof, and mixtures of two or more thereof, typically react with aluminum oxide to form garnet, beta alumina, or a perovskite phase.

The rare earth material and divalent metal cations (e.g., ions of Mg, Ni, Zn, or Co), if present, react with aluminum oxide to form hexagonal rare earth aluminates represented by the formula $LnMAl_{11}O_{19}$, wherein Ln is a trivalent metal ion such as La, Nd, Ce, Pr, Sm, Gd or Eu; M is the divalent metal cation; Al is aluminum; and O is oxygen. Such a reaction product is generally present in the sintered abrasive grain microstructure as platelets. The platelets typically having a diameter of about 0.5 to 1 micrometer and a thickness of about 0.05 micrometer. Further, cobalt oxide, nickel oxide, zinc oxide, and magnesium oxide typically form a spinel structure with aluminum oxide (e.g., $MgAl_2O_4$).

The density of abrasive grain according to the present invention typically is about 90 percent (or more) of theoretical, preferably, about 95 percent (or more). Abrasive grain according to the present invention generally have an average hardness of about 17 GPa or more. Preferably, the hardness is at least 18 GPa, more preferably, at least 20 GPa.

The above observations and the results of the following examples in detailed description are summarized by the following principles:

1. The presence of calcium (or strontium), for example, as calcia, strontia, or precursor(s) thereof, in a ceramic abrasive grain precursor is generally associated with the formation of a relatively soft, undesirable abrasive grain on sintering. The phenomenon is in part manifested through the formation of beta alumina. For this reason, conventional techniques for the formation of alumina-based ceramic abrasive grain have typically involved rigorous exclusion of calcium and strontium from the abrasive grain precursor. This is usually associated with processes involving deionized water and mineral additives having relatively little calcium (or strontium) contaminant therein. The phenomenon of negative effect is generally associated with the presence of calcium oxide (and/or strontium oxide) in the ceramic of about 0.07% by weight or more (calculated on a theoretical oxide basis as CaO and SrO), and is typically quite pronounced at about 0.1%.

2. According to the present invention, Ca/Sr material, if present in the alumina-based abrasive grain precursor, can, upon sintering, be rendered in a form such that it does not undesirably effect the hardness and/or toughness of the resulting sintered ceramic abrasive grain. In general, a method of effecting this is to react the Ca/Sr material to form a crystalline structure that will form a separate phase within the alpha alumina matrix of the sintered ceramic. This can be done, for example, by providing a sufficient amount of rare earth material selected from the group consisting of praseodymium oxide, samarium oxide, europium oxide, holmium oxide, lanthanum oxide, gadolinium oxide, dysprosium oxide, cerium oxide, neodymium oxide, erbium oxide, precursors thereof, and mixtures thereof, to ensure formation of crystalline reaction product with substantially all of the calcium and/or strontium. Levels of calcium oxide and/or strontium oxide of about 2 percent by weight (calculated on a theoretical oxide basis as CaO and SrO) in the sintered ceramic can be accommodated by the method disclosed herein. Further, it is believed that levels of calcium oxide and/or strontium oxide in excess of the 2 percent by weight level can be accommodated by the method disclosed herein.

3. In general, to achieve control of the undesirable effects from calcium and/or strontium abrasive grain precursor, at least a stoichiometric amount of rare earth material for reaction with the Ca/Sr material is needed. Preferably, a stoichiometric excess of the rare earth material is provided. In this manner, even a relatively large amount of Ca/Sr material in the abrasive grain precursor can be tolerated.

4. Provision of calcium and/or strontium in an abrasive grain formulation, including aluminum oxide and rare earth oxide therein, can result in a ceramic abrasive grain having improved performance, provided the calcium oxide and/or strontium oxide is present in an amount less than excess, with respect to formation of reaction product with rare earth oxide. In other words, performance of the abrasive grain is improved when reaction product of Ca/Sr material with rare earth material is present, by comparison to performance in the absence of any such reaction product containing calcium oxide and/or strontium oxide.

Abrasive Products

The present invention includes within its scope the provision of abrasive products including abrasive grain as described herein.

One type of abrasive product according to the present invention is a coated abrasive which comprises a backing (substrate) with abrasive grains, as described herein, adhered thereto by binder. The backing may be cloth, polymeric film, fiber, nonwoven web, paper, combinations thereof, or treated versions thereof. A variety of inorganic or organic binders could be utilized. The abrasive grains may be applied in one layer or a plurality of layers. Preferred methods of making coated abrasives are described in U.S. Pat. Nos. 4,734,104 (Broberg) and 4,737,163 (Larkey), the disclosures of which are incorporated herein by reference.

Figure 1:
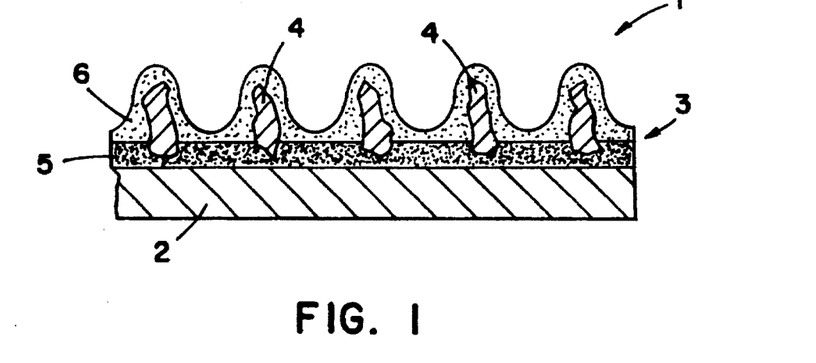
FIG. 1 is a partial cross-sectional schematic view of a coated abrasive product including abrasive grain according to the present invention therein.

An example of a coated abrasive product is provided in FIG. 1 at reference numeral 1. Referring thereto, backing (substrate) 2 has abrasive layer 3 comprising abrasive grain 4 secured to a major surface of backing 2 by make coat 5 and size coat 6. In some instances, a supersize coat, not shown, may be used.

Figure 2:
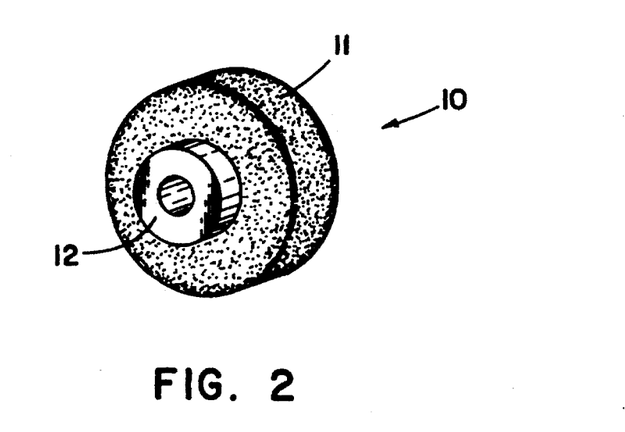
FIG. 2 is a perspective view of a bonded abrasive product including abrasive grain according to the present invention therein.

Bonded abrasive products (e.g., grinding wheels and cutoff wheels) according to the present invention generally comprise shaped masses of abrasive grain, described herein, held together by a binder. Conventional binders for grinding wheels include organic, metallic, or vitrified binder. In FIG. 2, grinding wheel 10 is depicted comprising abrasive grain 11 molded in a wheel and mounted on hub 12. For additional details in the preparation of grinding wheels see, for example, U.S. Pat. No. 4,997,461 (Markhoff-Matheny), the disclosure of which is incorporated herein by reference. Cutoff wheels can be made using conventional techniques known in the art. Binders for cutoff wheels include organic binder.

Figure 3:
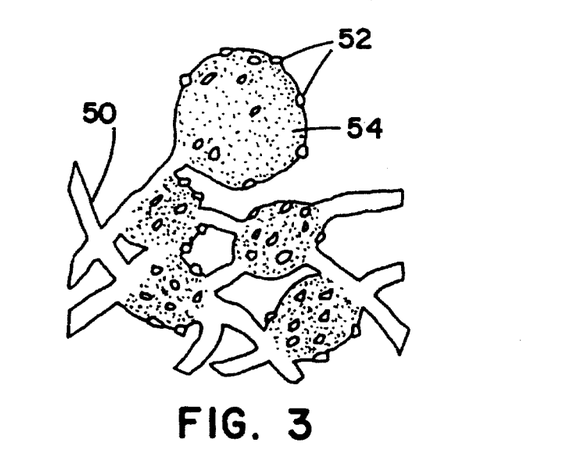
FIG. 3 is an enlarged schematic view of a nonwoven abrasive product incorporating abrasive grain according to the present invention.

Nonwoven abrasive products incorporating abrasive grains according to the present invention typically comprise an open porous lofty polymer filament structure having the abrasive grains of the invention distributed throughout the fiber structure and bonded therein by an organic binder. Typical fibrous filament structures usable with such constructions comprise polyamides, polyesters and polypropylenes. In FIG. 3, a schematic depiction, enlarged about 100×, of a typical nonwoven abrasive article is provided. The article comprises fibrous mat 50 as a substrate onto which abrasive grain 52 are adhered by binder 54. For additional details in the preparation of nonwoven abrasive products see, for example, U.S. Pat. No. 2,958,593 (Hoover et al.), the disclosure of which is incorporated herein by reference.

As indicated generally above, abrasive products according to the present invention generally comprise binder and abrasive grains or particles therein. A wide variety of binders may be utilized in abrasive products according to the present invention, including conventional ones. Useful organic binders include phenolic, urea-formaldehyde, melamine-formaldehyde, polyester resins, glue, aminoplast resins, epoxy resins, acrylate resins, urethane resins and combinations thereof. The binder may include inorganic particulates such as grinding aids or fillers. Examples of such grinding aids include cryolite, ammonium cryolite, potassium tetrafluoroborate, polyvinyl chloride, sulfur and sodium chloride. Examples of fillers include calcium carbonate, silica and calcium metasilicate.

Abrasive products or articles according to the present invention may contain, as particulate material therein, 100% abrasive grains which have been prepared or improved according to the descriptions herein. In addition, or alternatively, abrasive articles may contain a blend of abrasive grains according to the present invention with conventional abrasive grains or diluent grains. Conventional abrasive grains usable in this fashion include fused aluminum oxide, silicon carbide, garnet, fused alumina, diamond, cubic boron nitride, fused alumina-zirconia, and other sol-gel abrasive grains (see, e.g., U.S. Pat. Nos. 4,744,802 (Schwabel), 4,623,364 (Cottringer), 4,574,003 (Gerk), 5,011,508 (Wald), 4,518,397 (Leitheiser et al.), and 4,314,827 (Leitheiser), the disclosures of which are incorporated herein by reference). Diluent grains include marble, gypsum, and glass. Abrasive grains according to the present invention may be combined with abrasive agglomerates (see, e.g., U.S. Pat. No. 4,799,939 (Bloecher et al.)).

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

For all of the Examples, the abrasive grain were made according to one of the Procedures outlined below. All abrasive grain formulations are based upon weight on a theoretical elemental oxide basis, without regard to phases present. After the abrasive grains were made, they were incorporated into coated abrasive fibre discs which were made according to the described procedure.

In some of the examples, the performance of the abrasive grain was stated as percent of a control (i.e., the total amount of metal removed for the control example was equated to 100% and that for the abrasive grain of the examples was measured relative to the 100%).

In some instances, the density, hardness or toughness were measured for the abrasive grains. The hardness was measured using the general procedures of ASTM Test Method E384 ("Test Method For Microhardness of Materials," 1991 *Annual Books of ASTM Standards*, Sec 3, vol. 3.01, pp. 463–68). The toughness was measured using the general procedures described in "Equilibrium Penny-Like cracks in Indentation Fracture," *J. M. Sci*, 10, 1974, pp. 2016–24. The Vickers microhardness of the abrasive grain were measured using a conventional microhardness tester with a diamond indenter (commercially available under the trade designation "MINILOAD 2 MICROHARDNESS TESTER" from Leitz of Germany). Mounted abrasive grain samples were polished using conventional techniques to provide a 1 micrometer polished surface. The indenter (a highly polished pointed square pyramidal diamond with a face angle of 136 degrees) was brought into contact gradually and smoothly with the sample to be measured. The predetermined load was 500 grams. Reported values were an average of at least 5 measurements.

The toughness measurement was made using the same instrument as described above for the Vickers microhardness measurement, wherein a predetermined load was applied to the sample to be tested causing cracks to generate at the apex of the diamond shape impression of the indenter. The toughness would be determined using the following equation:

$$\text{Toughness,, } K_1 = \frac{F_N}{((\text{pi})c)^{3/2} (\tan \beta)},$$

wherein $c$ is the crack radius, $F_N$ is the indentor load, and $\beta$ is the semi-apical angle of the indenter (68 degrees for a Vickers diamond). Reported values are an average of at least 5 measurements.

The densities were determined using a Micromeritics (Norcross, Ga.) AccuPyc 1330 helium pycnometer.

General Procedure for Making the Abrasive Grain

The following were continuously dispersed together using a high shear mixer: 69.8 parts of approximately 60° C. deionized water, 2.3 parts of technical grade (i.e., 70%) nitric acid, and 28.5 parts alpha aluminum oxide monohydrate powder (commercially available under the trade designation "DISPERAL" from Condea Chemie GmbH of Hamburg, Germany). The resulting sol was dried over a 24 hour period starting at about 100° C. and increasing the temperature to about 180° C. The dried sol was a friable solid that was then crushed using a hammermill and then a roll crusher. The particles were then screened using screens having 1 mm openings and 0.125 mm openings, respectively. The screened particles were then calcined using a conventional rotary calciner to provide calcined particles substantially free of bound volatiles. The hot zone of the calciner was between 700°– 750° C. and the residence time was about 20 min.

Impregnation solutions were prepared which contained deionized water and the metal salts specified below. If calcium oxide was to be present in the sintered (ceramic) abrasive grain, $Ca(NO_3)_2 4H_2O$ powder was added to deionized water. The other impregnation solutions were prepared by first providing an initial aqueous solution having a sufficient amount of precursor to provide, on a theoretical oxide basis, 28% oxide. For example, for neodynium, the amount of precursor was sufficient to provide an initial solution, on a theoretical oxide basis, with 28% $Nd_2O_3$. The initial solutions were combined and/or diluted as needed to provide the desired level of oxide in the (sintered,) ceramic abrasive grain. For every impregnation, there was approximately 275 ml of impregnation solution to 500 grams of calcined particles. The impregnation solution and the calcined particles were thoroughly mixed together to cause the solution to be impregnated into the calcined particles by capillary action. The outer surfaces of the resulting impregnated particles were dried in a conventional forced air tumble dryer. The surface dried particles were calcined at about 650° C. in a conventional rotary calciner. If multiple impregnations were done, the calcined (non-sintered) particles would be allowed to cool, impregnated again with the desired impregnation solutions, and calcined. Next, the calcined, impregnated particles were sintered for several minutes at about 1400° C. using a conventional rotary kiln. The product exited the kiln into room temperature air where it was collected in a metal container and allowed to cool to room temperature.

General Procedure for Making Coated Abrasive Discs

The abrasive grain were incorporated into coated abrasive products which were then tested for abrasiveness. The coated abrasive products were made according to conventional coated abrasive-making procedures. A grade 50 abrasive grain was prepared by blending 50% by weight from abrasive grains that passed through a 40 mesh U.S. standard screen, but remained on a 45 mesh U.S. standard screen and 50% by weight of abrasive grains that passed through a 40 mesh U.S. standard screen, but were retained on a 50 mesh U.S. standard screen. Likewise, a grade 36 abrasive grain was prepared by blending 50% by weight from abrasive grains that passed through a 25 mesh U.S. standard screen, but remained on a 30 mesh U.S. standard screen and 50% by weight of abrasive grains that passed through a 30 mesh U.S. standard screen, but were retained on a 35 mesh U.S. standard screen. Using conventional techniques, the abrasive grain were bonded to vulcanized fibre backings using conventional calcium carbonate filled phenolic make resin and conventional calcium carbonate filled phenolic size resins. The fibre discs were flexed prior to testing.

Test Procedure I

The coated abrasive disc was mounted on a beveled aluminum back-up pad and used to grind the face of a 1.25 cm by 18 cm 1018 mild steel workpiece. The disc was driven at 5,500 rpm while the portion of the disc overlaying the beveled edge of the back-up pad contacted the workpiece with a load of about 6 kg. Each disc was used to grind a separate workpiece for a one-minute interval. The total cut was the summation of the amount of the workpiece removed for each of 12 one-minute intervals. The initial cut was the amount of metal removed in the first minute of grinding. The final cut was the amount of metal removed in the last minute of the test. There were about four discs per Example tested. The error associated with the test was about +/–5%.

Test Procedure II

A 17.8 cm diameter test coated abrasive disc with a 2.2 cm mounting hole was attached to a 16.5 cm diameter, 1.57 mm thick hard, phenolic backup pad which was in turn mounted onto a 15.2 cm diameter steel flange. The mounted disc was rotated counterclockwise at 3550 rpm. The 1.8 mm peripheral edge of a 25 cm diameter 304 stainless steel disc (workpiece) deployed 12° from a position normal to the abrasive disc and rotated counterclockwise at 2 rpm was placed into contact with the abrasive face of the abrasive disc under a load of about 4 kg. The workpiece was weighed at the start of the test and at 120-second intervals to determine the amount of stainless steel removed (i.e., abraded). The test endpoint was 12 minutes.

EXAMPLES 1–4 AND COMPARATIVE EXAMPLES A AND B

The abrasive grain for Examples 1 through 4 and Comparative Example A were made according to the General Procedure for Making the Abrasive Grain. The abrasive grain formulations are given in Table 1, below.

TABLE 1

| | Abrasive Grain Formulations | | | |
|---|---|---|---|---|
| Example | % $Al_2O_3$ | % $Nd_3O_3$ | % $Pr_2O_3$ | % CaO |
| 1 | 96.8 | 2.4 | 0 | 0.8 |
| 2 | 96.8 | 0 | 2.4 | 0.8 |
| 3 | 95.1 | 3.7 | 0 | 1.2 |
| 4 | 93.5 | 4.9 | 0 | 1.6 |
| Comp. A | 95.1 | 4.9 | 0 | 0 |

The abrasive grain were then screened to a grade 36 and incorporated into fiber discs. The abrasive grain for Comparative Example B was a grade 36 alumina-based, sol-gel derived abrasive grain comprising 95.6% aluminum oxide, 1.1% lanthanum oxide, 1.1% neodymium oxide, 1.1% magnesium oxide, and 1.1% yttrium oxide (commercially available under the trade designation "321 CUBITRON" from the 3M Company of St. Paul, Minn.). The fibre discs were tested according to Test Procedure I. The test results and density and hardness data are stated in Table 2, below.

TABLE 2

| | Test Results | | |
|---|---|---|---|
| Example | Hardness, GPa | Density, g/cm$^3$ | Total cut, grams |
| 1 | 18.7 | 3.81 | 1100 |
| 2 | 19.9 | 3.73 | 1066 |
| 3 | 20.6 | 3.86 | 1290 |
| 4 | 19.3 | 3.88 | 1129 |
| Comp. A | 22.3 | 3.94 | 911 |
| Comp. B | 22.3 | 3.91 | 1133 |

The toughness of the Example 3 abrasive grain was about 4.3 MPa·m$^{1/2}$. The toughness of the Comparative Example A abrasive grain was about 3.6 MPa·m$^{1/2}$.

The results show that the addition of calcium significantly increased the abrading performance of the abrasive grain. Further, Example 3 outperformed the commercially available abrasive grain tested (i.e., Comparative B).

EXAMPLES 5–8 AND COMPARATIVE EXAMPLE C

The abrasive grain for Examples 5–8 and Comparative Example C were made according to General Procedure for Making the Abrasive Grain. The impregnation solutions contained magnesium nitrate, lanthanum nitrate, yttrium nitrate, and neodymium nitrate. The amount of the impregnation solution was such that the sintered abrasive grain had the compositions given in Table 3, below.

TABLE 3

| | Abrasive Grain Formulations | | | | | |
|---|---|---|---|---|---|---|
| Example | Parts $Al_2O_3$ | Parts $La_2O_3$ | Parts $Nd_2O_3$ | Parts $Y_2O_3$ | Parts MgO | CaO, ppm |
| Comp. C | 95.6 | 1.1 | 1.1 | 1.1 | 1.1 | 0 |
| 5 | 95.6 | 1.1 | 1.1 | 1.1 | 1.1 | 200 |
| 6 | 95.6 | 1.1 | 1.1 | 1.1 | 1.1 | 1000 |
| 7 | 95.6 | 1.1 | 1.1 | 1.1 | 1.1 | 3000 |
| 8 | 95.6 | 1.1 | 1.1 | 1.1 | 1.1 | 6000 |

The abrasive grain of Examples 5–8 contained calcium oxide, whereas Comparative Example C did not contain calcium oxide. For Examples 5–8, after the impregnation, drying and calcining steps, the resulting particles were impregnated a second time with a calcium nitrate solution. These impregnated particles were calcined and sintered.

The abrasive grain were screened to a grade 50 and incorporated into a fiber disc. The fibre discs were tested according to Test Procedure II. The test results and density and hardness data are reported in Table 4, below.

TABLE 4

| | Test Results | | |
|---|---|---|---|
| Example | Hardness, GPa | Density, g/cm$^3$ | Total cut, grams |
| Comp. C | 19.3 | 3.89 | 142 |
| 5 | 20.3 | 3.88 | 146 |
| 6 | 21.2 | 3.87 | 144 |
| 7 | 19.5 | 3.84 | 140 |
| 8 | 19.6 | 3.82 | 108 |

EXAMPLES 9–13 AND COMPARATIVE EXAMPLE D

The abrasive grain for Examples 9–13 and Comparative Example D were made according to General Procedure for Making the Abrasive Grain. For Examples 9–13, the impregnation solution contained calcium nitrate, magnesium nitrate, lanthanum nitrate, yttrium nitrate, and neodymium nitrate. For Comparative Example D, the impregnation solution contained magnesium nitrate, lanthanum nitrate, yttrium nitrate, and neodymium nitrate. The sintered abrasive grain compositions are listed below in Table 5, below.

TABLE 5

| | Abrasive Grain Formulations | | | | | |
|---|---|---|---|---|---|---|
| Example | Parts $Al_2O_3$ | Parts $La_2O_3$ | Parts $Nd_2O_3$ | Parts $Y_2O_3$ | Parts MgO | CaO, ppm |
| Comp. D | 95.6 | 1.1 | 1.1 | 1.1 | 1.1 | 0 |
| 9 | 95.6 | 1.1 | 1.1 | 1.1 | 1.1 | 200 |
| 10 | 95.6 | 1.1 | 1.1 | 1.1 | 1.1 | 1000 |
| 11 | 95.6 | 1.1 | 1.1 | 1.1 | 1.1 | 3000 |
| 12 | 95.6 | 1.1 | 1.1 | 1.1 | 1.1 | 6000 |
| 13 | 95.6 | 1.1 | 1.1 | 1.1 | 1.1 | 10000 |

The abrasive grains were screened to a grade 36 and incorporated into a fiber disc. The fibre discs were tested according to Test Procedure II. The test results and density and hardness data are reported in Table 6, below.

TABLE 6

| | Test Results | | |
|---|---|---|---|
| Example | Hardness, GPa | Density, g/cm³ | Total cut, grams |
| Comp. D | 20 | 3.89 | 249 |
| 9 | 20.6 | 3.86 | 225 |
| 10 | 21.2 | 3.88 | 222 |
| 11 | 21.6 | 3.87 | 239 |
| 12 | 20.8 | 3.87 | 230 |
| 13 | 19.4 | 3.83 | 227 |

The abrasive grain of Examples 9–13 and Comparative D were examined under a scanning electron microscope. It appeared that the calcium oxide addition resulted in the formation of more platelets per unit area at the magnification observed (i.e., 25,000×).

EXAMPLES 14–19 AND COMPARATIVE EXAMPLES B–E

The abrasive grain for Examples 14–19 and Comparative Example E were made according to General Procedure for Making the Abrasive Grain. The abrasive grain formulations are reported in Table 7, below.

TABLE 7

| | Abrasive Grain Formulations | | | |
|---|---|---|---|---|
| Example | % Al₂O₃ | % Nd₂O₃ | % SrO | % CaO |
| 14 | 96 | 3.2 | 0 | 0.8 |
| 15 | 94.5 | 4.7 | 0 | 0.8 |
| 16 | 95.2 | 3.2 | 0 | 1.6 |
| 17 | 93.7 | 4.7 | 0 | 1.6 |
| 18 | 95.1 | 3.7 | 0 | 1.2 |
| 19 | 95.4 | 3.5 | 1.1 | 0 |
| Comp. E | 94 | 0 | 6 | 0 |

The abrasive grain of Example 19 and Comparative Example E contained strontium oxide. The strontium oxide source was strontium nitrate and was introduced via impregnating solutions. The abrasive grain were then screened to a grade 36 and incorporated into fiber discs. The fibre discs were tested according to Test Procedure I. The test results and the density and hardness data are reported in Table 8, below.

TABLE 8

| | Test Results | |
|---|---|---|
| Example | Density g/cm³ | Total cut, grams |
| 14 | 3.73 | 1064 |
| 15 | 3.79 | 1095 |
| 16 | 3.71 | 1077 |
| 17 | 3.71 | 1121 |
| 18 | 3.72 | 1112 |
| 19 | 3.91 | 1063 |
| Comp. B | — | 1115 |
| Comp. E | 3.87 | 50 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A ceramic abrasive grain comprising:
   (a) an alpha alumina matrix; and
   (b) one or more crystalline reaction products, each comprising aluminum oxide, a rare earth oxide selected from the group consisting of praseodymium oxide, samarium oxide, europium oxide, holmium oxide, lanthanum oxide, gadolinium oxide, dysprosium oxide, neodymium oxide, erbium oxide, and mixtures thereof, and at least 0.07 percent by weight, based on the total weight of said abrasive grain, of calcium oxide, strontium oxide, or a combination thereof, said crystalline reaction products comprising a phase or phases within said alpha alumina matrix, said abrasive grain having an average hardness of at least 17 GPa.

2. The ceramic abrasive graon according to claim 1, whrein any calcium oxide and strontium oxide present is in said one or more crystalline reaction products.

3. The ceramic abrasive grain according to claim 1, said ceramic abrasive grain comprising at least 0.1 percent by weight of said one of calcium oxide, strontium oxide, or a combination thereof, in said one or more crystalline reaction products.

4. The ceramic abrasive grain according to claim 3, said ceramic abrasive grain comprising in the range from about 0.1 to about 2 percent by weight of said one of calcium oxide, strontium oxide, or a combination thereof, in said one or more crystalline reaction products.

5. The ceramic abrasive grain according to claim 3 wherein said one or more crystalline reaction products are selected from the group consisting of $SrLnAlO_4$, $Sr_{1-x}Ln_xAl_{12-x}O_{19-x}$, $Sr_{1-x}Ln_xM_xAl_{12-x}O_{19}$, $CaLnAlO_4$, $Ca_{1-x}Ln_xAl_{12-x}O_{19-x}$, $Ca_{1-x}Ln_xM_xAl_{12-x}O_{19}$, and mixtures thereof, wherein Ln is selected from the group consisting of praseodymium, samarium, europium, holmium, lanthanum, gadolinium, dysprosium, neodymium, erbium, and mixtures thereof wherein M is a divalent metal cation;

Ca is calcium;

Sr is strontium;

Al is aluminum;

O is oxygen; and $1 \geq x \geq 0$.

6. The ceramic abrasive grain according to claim 5 wherein M is selected from the group consisting of magnesium, iron, nickel, zinc, cobalt, and combinations thereof.

7. The ceramic abrasive grain according to claim 1 further comprising an oxide selected from the group consisting of magnesium oxide, yttrium oxide, zinc oxide, zirconium oxide, titanium oxide, hafnium oxide, nickel oxide, silicon oxide, cobalt oxide, chromium oxide, iron oxide, and combinations thereof.

8. An abrasive article comprising:
   (a) a binder; and
   (b) a plurality of abrasive grain according to claim 1 secured within said article by said binder.

9. The abrasive article according to claim 8 which is a grinding wheel.

10. The abrasive article according to claim 8 which is a cutoff wheel.

11. A coated abrasive article comprising:
   (a) a backing having a major surface; and
   (b) an abrasive layer comprising abrasive grain according to claim 1 secured to said major surface of said backing by a binder.

12. A ceramic abrasive grain comprising:
(a) an alpha alumina matrix; and
(b) one or more crystalline reaction products, each comprising aluminum oxide, a rare earth oxide selected from the group consisting of praseodymium oxide, samarium oxide, europium oxide, holmium oxide, lanthanum oxide, gadolinium oxide, dysprosium oxide, cerium oxide, neodymium oxide, erbium oxide, and mixtures thereof, and at least 0.07 percent by weight, based on the total weight of said abrasive grain, of strontium oxide, said crystalline reaction products comprising a phase or phases within said alpha alumina matrix, said abrasive grain having an average hardness of at least 17 GPa.

13. The ceramic abrasive grain according to claim 12, wherein all strontium oxide present is in said one or more crystalline reaction products.

14. The ceramic abrasive grain according to claim 12, said ceramic abrasive grain comprising at least 0.1 percent by weight of said strontium oxide in said one or more crystalline reaction products.

15. The ceramic abrasive grain according to claim 14, said ceramic abrasive grain comprising in the range from about 0.1 to about 2 percent by weight of said strontium oxide in said one or more crystalline reaction products.

16. The ceramic abrasive grain according to claim 15 wherein said one or more crystalline reaction products are selected from the group consisting of $SrLnAlO_4$, $Sr_{1-x}Ln_xAl_{12-x}O_{19-x}$, $Sr_{1-x}Ln_xM_xAl_{12-n}O_{19}$, and mixtures thereof, wherein Ln is selected from the group consisting of praseodymium, samarium, europium, holmium, lanthanum, gadolinium, dysprosium, cerium, neodymium, erbium, and mixtures thereof wherein M is a divalent metal cation;

Sr is strontium;

Al is aluminum;

O is oxygen; and $1 \geq x 0$.

17. The ceramic abrasive grain according to claim 16 wherein M is selected from the group consisting of magnesium, iron, nickel, cobalt, and combinations thereof.

18. An abrasive article comprising:
(a) a binder, and
(b) a plurality of abrasive grain according to claim 12 secured within said article by said binder.

* * * * *

UNITED STATES PATENT AND TRADEMARK OFFICE
CERTIFICATE OF CORRECTION

PATENT NO.   : 5,489,318
DATED        : February 6, 1996
INVENTOR(S)  : Erickson et al.

Page 1 of 1

It is certified that error appears in the above-identified patent and that said Letters Patent is hereby corrected as shown below:

Item [56] References Cited,
Please add the reference -- 5,110,322  5/1992  Narayanan et al.  51/293 --.

Column 10,
Line 15, please change "$Sr_{1-x}Ln_xM_xAl_{12-x}O_{19}$; and" to -- $Sr_{1-x}Ln_xM_xAl_{12-x}O_{19}$; $Ca_{1-x}Ln_xAl_{12-x}O_{19-x}$; and --.

Column 13,
Line 40, please change "Toughness,,K1" to -- Toughness, K1 --.

Column 15,
Line 26, please change "%$Nd_3O_3$" to -- %$Nd_2O_3$ --.

Column 18,
Line 17, please change "graon" to -- grain --.
Line 31, please change "$Sr_{1Xx}L$-" to -- $Sr_{1-x}L$- --.

Signed and Sealed this

Twenty-fifth Day of December, 2001

Attest:

JAMES E. ROGAN
*Attesting Officer*

*Director of the United States Patent and Trademark Office*